(12) United States Patent
Kim et al.

(10) Patent No.: US 12,367,595 B2
(45) Date of Patent: Jul. 22, 2025

(54) METHOD AND APPARATUS WITH VIRTUAL OBJECT RENDERING

(71) Applicants: SAMSUNG ELECTRONICS CO., LTD., Suwon-si (KR); Korea University Research and Business Foundation, Seoul (KR)

(72) Inventors: Joongheon Kim, Seoul (KR); SooHyun Park, Incheon (KR); Won Joon Yun, Seoul (KR); Youn Kyu Lee, Seoul (KR); Soyi Jung, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 493 days.

(21) Appl. No.: 17/739,818

(22) Filed: May 9, 2022

(65) Prior Publication Data
US 2023/0092984 A1    Mar. 23, 2023

(30) Foreign Application Priority Data
Sep. 17, 2021   (KR) .................. 10-2021-0125267

(51) Int. Cl.
G06T 7/246 (2017.01)
G06T 7/215 (2017.01)
G06T 15/10 (2011.01)

(52) U.S. Cl.
CPC .............. *G06T 7/215* (2017.01); *G06T 7/251* (2017.01); *G06T 15/10* (2013.01); *G06T 2207/20081* (2013.01); *G06T 2207/30241* (2013.01)

(58) Field of Classification Search
CPC ......... G06T 7/215; G06T 7/251; G06T 15/10; G06T 2207/20081; G06T 2207/30241;
(Continued)

(56) References Cited

U.S. PATENT DOCUMENTS 9,972,122 B1 *   5/2018  Yee .................... G06T 15/40
10,139,899 B1 * 11/2018  Niemeyer ............ A63F 13/816
(Continued)

FOREIGN PATENT DOCUMENTS

| CN | 112720504 A | 4/2021 |
| JP | 2021-86511 A | 6/2021 |
| KR | 10-2014-0010616 A | 1/2014 |

OTHER PUBLICATIONS

Tang, Xiao, et al. "Grabar: occlusion-aware grabbing virtual objects in AR." *Proceedings of the 33rd Annual ACM Symposium on User Interface Software and Technology*.Oct. 20, 2020. pp. 697-708.

*Primary Examiner* — Huo Long Chen
(74) *Attorney, Agent, or Firm* — NSIP Law

(57) ABSTRACT

A processor-implemented method with virtual object rendering includes: determining a plurality of predictive trajectories of a first object according to a Gaussian random path based on a high-level model that is trained by hierarchical reinforcement learning; determining direction information of a second object according to subgoals corresponding to the predictive trajectories based on a low-level model that is trained by hierarchical reinforcement learning; determining direction information of the second object according to a subgoal corresponding to one of the predictive trajectories based on an actual trajectory of the first object; and rendering the second object, which is a virtual object, based on the determined direction information.

22 Claims, 16 Drawing Sheets

(58) Field of Classification Search
CPC .................... G06T 7/70; G06T 19/003; G06T 2207/20076; G06N 20/00; G06V 10/40
See application file for complete search history.

(56) References Cited

U.S. PATENT DOCUMENTS

| | | | |
|---|---|---|---|
| 10,409,363 B1* | 9/2019 | Kudirka | A63F 13/211 |
| 10,877,558 B1 | 12/2020 | Zhao | |
| 11,498,587 B1* | 11/2022 | Mitlin | G05D 1/0214 |
| 2009/0087029 A1* | 4/2009 | Coleman | G06V 10/255 |
| | | | 382/103 |
| 2014/0015831 A1 | 1/2014 | Kim et al. | |
| 2014/0241619 A1* | 8/2014 | Yoo | G06V 20/54 |
| | | | 382/159 |
| 2018/0045963 A1* | 2/2018 | Hoover | G02B 27/0189 |
| 2019/0126125 A1* | 5/2019 | Kudirka | G06T 19/006 |
| 2019/0134487 A1* | 5/2019 | Kudirka | A63F 13/211 |
| 2021/0052991 A1* | 2/2021 | Krauthamer | G06F 3/011 |
| 2022/0038624 A1* | 2/2022 | Hsieh | G11B 27/031 |

\* cited by examiner

Algorithm 1 Training Procedure for the GRT-HL

Notation. $\pi_{meta}$: high-level policy, $\pi$: low-level policy.
Input: trajectories $\tau$ and its label $y$ drawn from GRP.
Init: parameters $\phi, \theta, \psi, \omega$ and number of trajectories $M$.

1: while convergence of parameters $(\phi, \theta, \psi)$ do
2:     $\pi_{meta} \leftarrow p_\theta(\tau|z, y)$ (Pre-trained trajectory decoder)
3:     $\pi_{meta}$ generates $M$ target trajectories $\{\tau_1, \ldots, \tau_M\}$.
4:     for $\tau_i = \tau_1 \ldots \tau_M$ do
5:         $\pi_{option}$ controls the end-effector for following $\tau_i$.
6:         if time to update $\pi$ then
7:             for $k = 1 \ldots K_{ep}$ do
8:                 Update $\pi$ using (Eq. 21).
9:             end for
10:         end if
11:     end for
12:     Update $\pi_{meta}$ with a variant contrastive loss (Eq. 16).
13:     Update $\phi, \theta, \psi$ using (Eq. 15).
14: end while

FIG. 6

METHOD AND APPARATUS WITH VIRTUAL OBJECT RENDERING

CROSS-REFERENCE TO RELATED APPLICATIONS

This application claims the benefit under 35 USC § 119(a) of Korean Patent Application No. 10-2021-0125267, filed on Sep. 17, 2021 in the Korean Intellectual Property Office, the entire disclosure of which is incorporated herein by reference for all purposes.

BACKGROUND

1. Field

The following description relates to a method and apparatus with virtual object rendering.

2. Description of Related Art

Virtual reality (VR) may refer to an environment or situation that is not real but similar to reality artificially created using computers and the like, or to the technology itself. Augmented reality (AR) belongs to the field of VR and may include computer graphics technology that synthesizes virtual objects or information into a real environment to make the objects or information look like objects that exist in the original environment. However, typical technology may be inefficient or inadequate for rendering in real time a virtual object that interacts with a real environment to apply in real time an effect of synthesis to an image captured with a camera or to provide simulation experiences in an online environment. Accordingly, a typical technique may be inefficient or inadequate for enhancing user experience sharing by rendering a virtual object to naturally interact with a real environment and reflect a change in the real environment in real time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with virtual object rendering includes: determining a plurality of predictive trajectories of a first object according to a Gaussian random path based on a high-level model that is trained by hierarchical reinforcement learning; determining direction information of a second object according to subgoals corresponding to the predictive trajectories based on a low-level model that is trained by hierarchical reinforcement learning; determining direction information of the second object according to a subgoal corresponding to one of the predictive trajectories based on an actual trajectory of the first object; and rendering the second object, which is a virtual object, based on the determined direction information.

The determining of the direction information of the second object may include: selecting one of the predictive trajectories based on similarities between the actual trajectory and the predictive trajectories; and determining the direction information of the second object according to a subgoal corresponding to the selected predictive trajectory.

The determining of the plurality of predictive trajectories of the first object may include determining a plurality of predictive trajectories corresponding to latent variables related to the Gaussian random path and vector labels between a start point and an end point related to the Gaussian random path, based on a pre-trained trajectory decoder of the high-level model.

The high-level model may include a trajectory encoder and a trajectory decoder, and the trajectory encoder may be trained to output a latent variable corresponding to an input Gaussian random path, and the trajectory decoder may be trained to output a trajectory according to the input Gaussian random path based on the latent variable output from the trajectory encoder and vector labels of a start point and an end point related to the Gaussian random path.

The trajectory encoder may be adversarially trained based on a discriminator trained to discriminate between a prior latent variable corresponding to an input Gaussian random path and the latent variable output from the trajectory encoder.

The low-level model may be trained, for the predictive trajectories output from the high-level model, to output direction information of the second object moving along the predictive trajectories.

The method may include: extracting a feature point of the first object from an input image; and determining the actual trajectory of the first object based on a displacement of the extracted feature point included in a frame of the image.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with virtual object rendering model training includes: training, based on an input Gaussian random path, a trajectory encoder of a high-level model to output a latent variable of the Gaussian random path; training a trajectory decoder of the high-level model to output a trajectory according to the Gaussian random path based on the latent variable output from the trajectory encoder and a vector label between a current position and a target point position; determining a plurality of trajectories based on the trained trajectory decoder; and training, for the plurality of determined trajectories, a low-level model to output direction information of a virtual object moving along the trajectories.

The input Gaussian random path may include at least one trajectory that follows a multivariate Gaussian distribution.

The training of the trajectory encoder may include adversarially training the trajectory encoder based on a discriminator trained to discriminate between a prior latent variable corresponding to the input Gaussian random path and the latent variable output from the trajectory encoder.

The training of the trajectory decoder may include training the trajectory decoder based on a loss function to reduce a difference between a generated trajectory and a line between a start point and an end point related to the Gaussian random path.

The training of the low-level model may include training the low-level model to output the direction information of the virtual object moving along the trajectory based on an internal reward function that is based on a difference between first position information corresponding to a first timestep of the trajectory and second position information corresponding to a second timestep of the trajectory.

The method may include: determining a plurality of predictive trajectories of a first object according to the Gaussian random path based on the trained trajectory encoder of the high-level model; determining direction information of a second object according to subgoals corresponding to the predictive trajectories based on the trained low-level model; determining direction information of the second object according to a subgoal corresponding to one of the predictive trajectories based on an actual trajectory of the first object; and rendering the second object, which is the virtual object, based on the determined direction information.

In another general aspect, an apparatus with virtual object rendering includes: one or more processors configured to: determine a plurality of predictive trajectories of a first object according to a Gaussian random path based on a high-level model that is trained by hierarchical reinforcement learning, determine direction information of a second object according to subgoals corresponding to the predictive trajectories based on a low-level model that is trained by hierarchical reinforcement learning, determine direction information of the second object according to a subgoal corresponding to one of the predictive trajectories based on an actual trajectory of the first object, and render the second object, which is a virtual object, based on the determined direction information.

The one or more processors may be configured to, in determining the direction information of the second object: select one of the predictive trajectories based on similarities between the actual trajectory and the predictive trajectories, and determine the direction information of the second object according to a subgoal corresponding to the selected predictive trajectory.

The one or more processors may be configured to, in determining the plurality of predictive trajectories of the first object: determine a plurality of predictive trajectories corresponding to latent variables related to the Gaussian random path and vector labels between a start point and an end point related to the Gaussian random path, based on a pre-trained trajectory decoder of the high-level model.

The high-level model may include a trajectory encoder and a trajectory decoder, and the trajectory encoder may be trained to output a latent variable corresponding to an input Gaussian random path, and the trajectory decoder may be trained to output a trajectory according to the Gaussian random path based on the latent variable output from the trajectory encoder and vector labels of a start point and an end point related to the Gaussian random path.

The trajectory encoder may be adversarially trained based on a discriminator trained to discriminate between a prior latent variable corresponding to an input Gaussian random path and the latent variable output from the trajectory encoder.

The low-level model may be trained, for the predictive trajectories output from the high-level model, to output direction information of the second object moving along the predictive trajectories.

The one or more processors may be configured to, in determining the direction information of the second object: extract a feature point of the first object from an input image, and determine the actual trajectory of the first object based on a displacement of the extracted feature point included in a frame of the image.

In another general aspect, a processor-implemented method with virtual object rendering includes: determining a plurality of predictive trajectories of a real object according to a Gaussian random path based on a high-level model that is trained to output a latent variable corresponding to the Gaussian random path and to output a trajectory according to the Gaussian random path based on the latent variable; determining direction information of a virtual object according to subgoals corresponding to the predictive trajectories based on a low-level model that is trained using the trained high-level model; and rendering the virtual object based on the determined direction information.

The low-level model may be trained based on trajectories generated at random using the high-level model.

The high-level model may be trained to output the trajectory according to the Gaussian random path based on a variant contrastive loss of the output trajectory.

Other features and aspects will be apparent from the following detailed description, the drawings, and the claims.

BRIEF DESCRIPTION OF THE DRAWINGS

FIG. 6 illustrates an example of an overall training algorithm.

Figure 1:
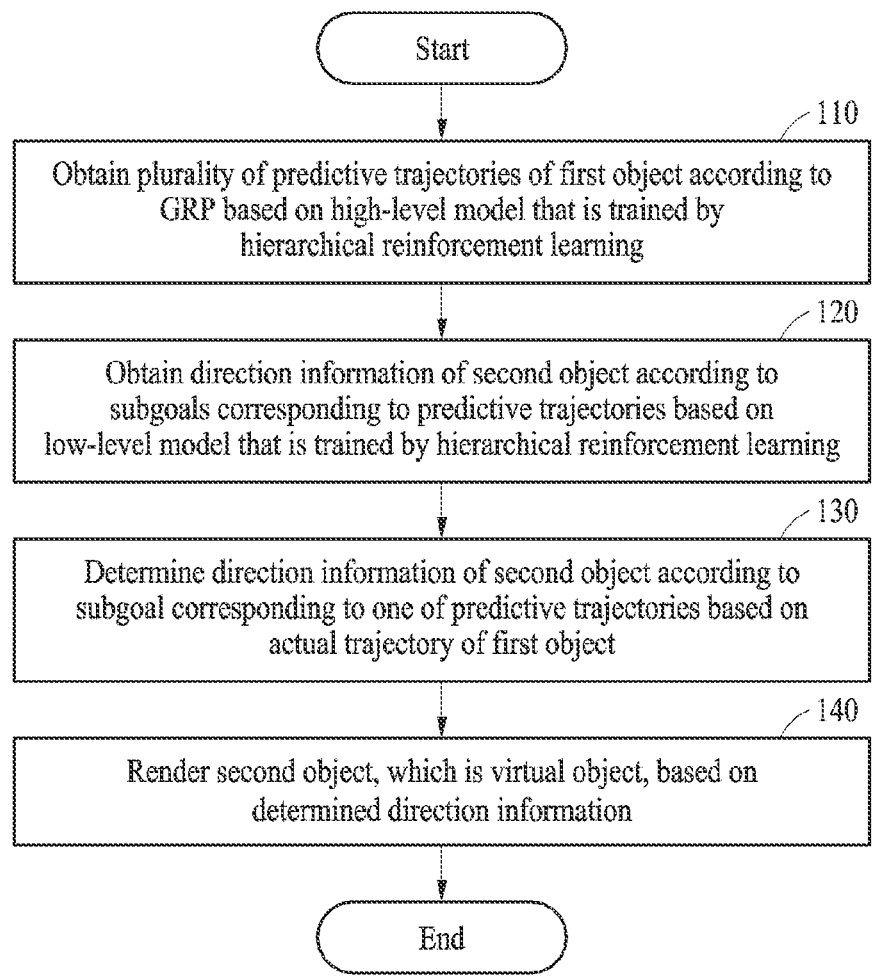
FIG. 1 illustrates an example of a virtual object rendering method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "comprises," "includes," and "has" specify the presence of stated integers, steps, features, numbers, operations, members, elements, and/or combinations thereof, but do not preclude the presence or addition of one or more other integers, steps, features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when an element, such as a layer, region, or substrate, is described as being "on," "connected to," or "coupled to" the other element, it may be directly "on," "connected to," or "coupled to" the other component, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of a virtual object rendering method.

Referring to FIG. 1, a virtual object rendering method may include operation 110 of obtaining a plurality of predictive trajectories of a first object according to a Gaussian random path (GRP) based on a high-level model that is trained by hierarchical reinforcement learning, operation 120 of obtaining direction information of a second object according to subgoals corresponding to the predictive trajectories based on a low-level model that is trained by hierarchical reinforcement learning, operation 130 of determining direction information of the second object according to a subgoal corresponding to one of the predictive trajectories based on an actual trajectory of the first object, and operation 140 of rendering the second object, which is a virtual object, based on the determined direction information.

The virtual object rendering method may include a method of rendering a second object, which is a virtual object that moves according to a displacement of a moving first object (e.g., a real object), in an image including the first object. For example, the first object may be a human hand, and the second object may be a virtual object held in the human hand. In this example, the virtual object rendering method may include a method of rendering the virtual object to be moved while being held in the human hand according to a movement of the human hand.

Operation 110 may include obtaining a plurality of predictive trajectories corresponding to latent variables related to the GRP and vector labels between a start point and an end point related to the GRP, based on a pre-trained trajectory decoder of the high-level model. For example, the start point related to the GRP may correspond to a current position of the first object. For example, the end point related to the GRP may correspond to a predetermined point. Alternatively or additionally, the end point related to the GRP may correspond to a point that is predicted based on information about a past trajectory and the current position of the first object. For example, the end point may be predicted as a point on a line between the current position and a previous position of the first object.

Operation 120 may be performed based on a low-level policy of the low-level model that is trained by hierarchical reinforcement learning, a non-limiting example of which will be described in detail below.

Operation 130 may include selecting one of the predictive trajectories based on similarities between the actual trajectory and the predictive trajectories of the first object, and determining the direction information of the second object according to a subgoal corresponding to the selected predictive trajectory. For example, a predictive trajectory most similar to the actual trajectory of the first object may be selected from among the predictive trajectories.

According to an example, operation 130 of determining the direction information of the second object may further include extracting a feature point of the first object from an input image, and obtaining the actual trajectory of the first object based on a displacement of the extracted feature point included in a frame of the image. For example, at least one feature point corresponding to a human hand may be extracted from an image in which the human hand moves, and an actual trajectory of the human hand may be obtained based on a displacement of the feature point according to a time order of frames included in the image.

Operation 140 may include rendering the second object, which is a virtual object, to follow the determined direction information. The second object may be rendered to move along the trajectory of the first object.

The high-level model may include a trajectory encoder and a trajectory decoder. The trajectory encoder may be trained to output a latent variable corresponding to an input GRP, and the trajectory decoder may be trained to output a trajectory according to the GRP based on the latent variable output from the trajectory encoder and vector labels of a start point and an end point related to the GRP.

According to an example, the trajectory encoder may be adversarially trained based on a discriminator trained to discriminate between a prior latent variable corresponding to the input GRP and the latent variable output from the trajectory encoder.

The low-level model may be trained, for the predictive trajectories output from the high-level model, to output direction information of the second object moving along the predictive trajectories.

In other words, a method of training a virtual object rendering model based on hierarchical reinforcement learning may include training, based on an input GRP, a trajectory encoder of a high-level model to output a latent variable of the GRP, training a trajectory decoder of the high-level model to output a trajectory according to the GRP based on the latent variable output from the trajectory encoder and a vector label between a current position and a target point position, obtaining a plurality of trajectories based on the trained trajectory decoder, and training, for the plurality of obtained trajectories, a low-level model to output direction information of a virtual object moving along the trajectories.

According to an example, the GRP input to the trajectory encoder for training the high-level model may include at least one trajectory following a multivariate Gaussian distribution. The GRP will be described below.

According to an example, the high-level model may further include a discriminator trained to discriminate between a prior latent variable corresponding to the GRP and the latent variable output from the trajectory encoder. The training of the trajectory encoder may further include adversarially training the trajectory encoder based on the discriminator trained to discriminate between the prior latent variable corresponding to the input GRP and the latent variable output from the trajectory encoder.

The training of the low-level model may include training the low-level model to output the direction information of the virtual object moving along the trajectory based on an internal reward function that is based on a difference between first position information corresponding to a first timestep of the trajectory generated by the trajectory decoder and second position information corresponding to a second timestep of the trajectory.

The method of operating the high-level model and the low-level model and the method of training the high-level model and the low-level model will be described hereinafter.

Figure 2:
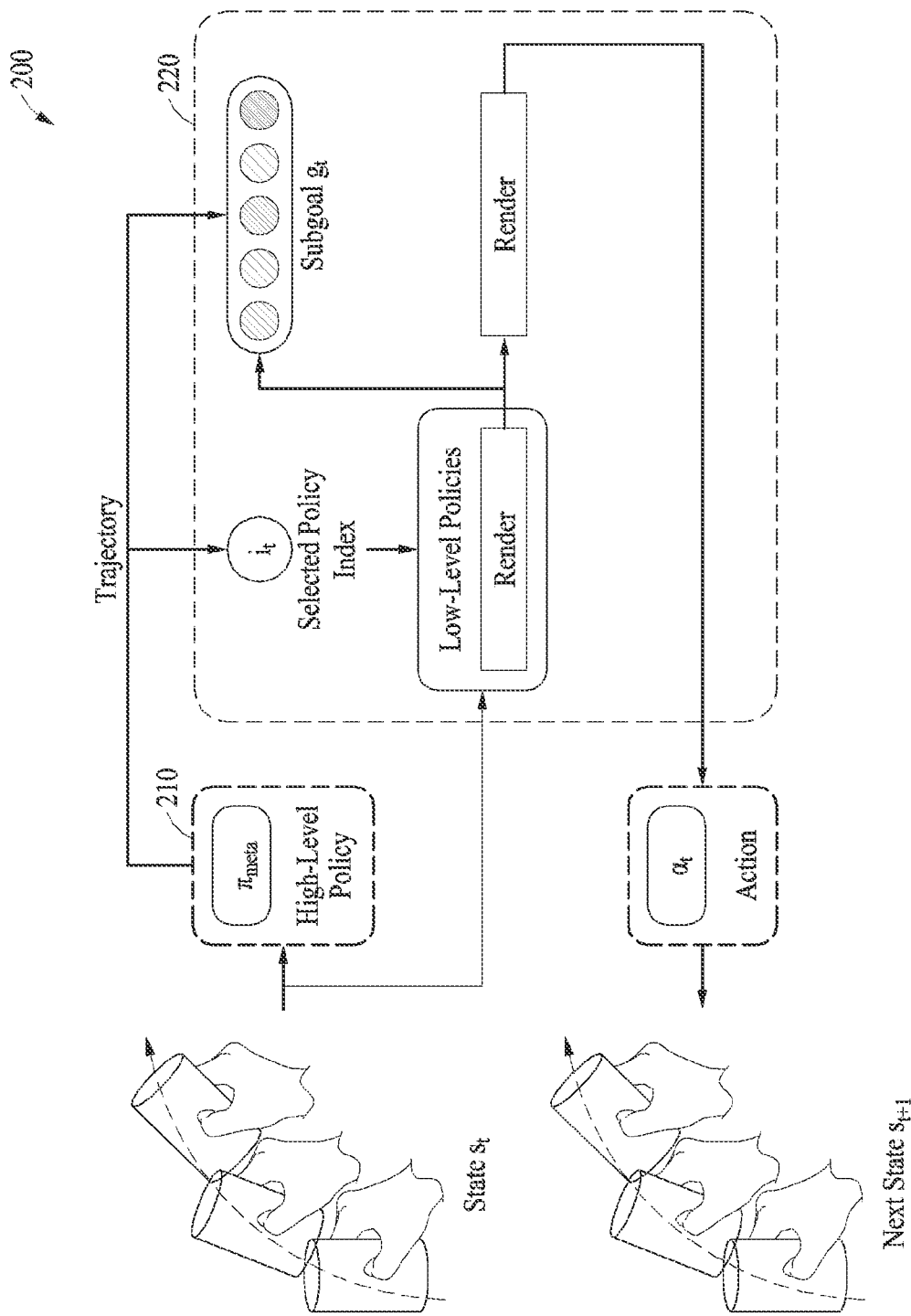
FIG. 2 illustrates an example of a framework for virtual object rendering.

FIG. 2 illustrates an example of a framework for virtual object rendering. Hereinafter, it will be described based on an example in which a first object, which is a real object, is a human hand, and a second object is a virtual object to be rendered to move along a trajectory of the hand.

Referring to FIG. 2, a framework 200 for virtual object rendering may receive state information $s_t$ (e.g., of the first object) at a time t and output an action $a_t$ (e.g., $\alpha_t$) of an agent for determining a next state $s_{t+1}$ (e.g., of the first object) at a time t+1. The agent may correspond to the virtual object to be rendered.

For example, the state information may correspond to or include position information of a hand, thumb, fingertip, wrist, elbow, and shoulder which are real objects (e.g., the first object), and more particularly, correspond to position information of feature points, corresponding to the hand, thumb, fingertip, wrist, elbow, and shoulder, extracted from each of a plurality of frames of a captured image of a moving person.

The framework 200 for virtual object rendering may include a metacontroller 210 and a controller 220 that are trained using hierarchical reinforcement learning. The metacontroller 210 may correspond to a high-level model, and the controller 220 may correspond to a low-level model. The metacontroller 210 may operate based on a high-level policy. More specifically, the metacontroller 210 may generate a subgoal for maximizing an external reward according to the high-level policy and transmit the subgoal to the controller 220. Hereinafter, the high-level policy may be denoted as $\pi_{meta}$, and the subgoal output from the metacontroller 210 may be denoted as g. The controller 220 may operate based on a low-level policy. More specifically, the controller 220 may maximize an internal reward corresponding to the subgoal obtained from the high-level policy according to the low-level policy.

According to an example, an optimal action-value function (e.g., Q-value function) of the metacontroller 210 corresponding to the high-level policy may be defined as expressed by Equation 1 below, for example.

$$Q^*_{meta}(s, g) = \max_{\pi_{meta}} E\left[\sum_{t'=t}^{t+N} f_{t'} + \gamma \max_{g_{t+N}} Q^*_{meta}(s_{t+N}, g_{t+N}) \mid s_t = s, g_t = g, \pi_{meta}\right] \quad \text{Equation 1}$$

In Equation 1, N denotes the number of timesteps until the controller 220 stops for a provided current goal. $g_{t+N}$ denotes a subgoal of the agent in a state $s_{t+N}$. $\pi_{meta}=P(g|s)$ denotes the high-level policy. $\gamma$ denotes a depreciation rate. $f_t$, $s_t$, and $g_t$ denote an external reward, a state, and a subgoal at the time t, respectively. The optimal action-value function $Q^*_{meta}$ of the metacontroller 210 in Equation 1 may be expressed as a cumulative sum of rewards through actions of the controller 220 during N timesteps.

According to an example, an optimal action-value function of the controller 220 corresponding to the low-level policy may be defined as expressed by Equation 2 below, for example.

$$Q^*(s, a; g) = \max_{\pi} E\left[r_t + \gamma \max_{a_{t+1}} Q^*(s_{t+1}, a_{t+1}; g) \mid s_t = s, g_t = g, \pi\right] \quad \text{Equation 2}$$

In Equation 2, g denotes a subgoal of the agent in a state s. $\pi=P(a|s, g)$ denotes the low-level policy. $\gamma$ denotes a depreciation rate. $r_t$, $s_t$, $a_t$, and $g_t$ denote an internal reward, a state, an action of the agent, and a subgoal at the time t, respectively. In addition, $Q^*$ in Equation 2 may output an action for achieving the subgoal g regardless of the external reward.

Hereinafter, the metacontroller 210 operating based on the high-level policy may be referred to as a high-level model, and the controller 220 operating based on the low-level policy may be referred to as a low-level model.

According to an example, the high-level model may determine a subgoal g corresponding to a trajectory that follows a GRP, and the low-level model may receive the trajectory and observable state information and render a virtual object to follow the trajectory generated by the high-level model.

Figure 3:
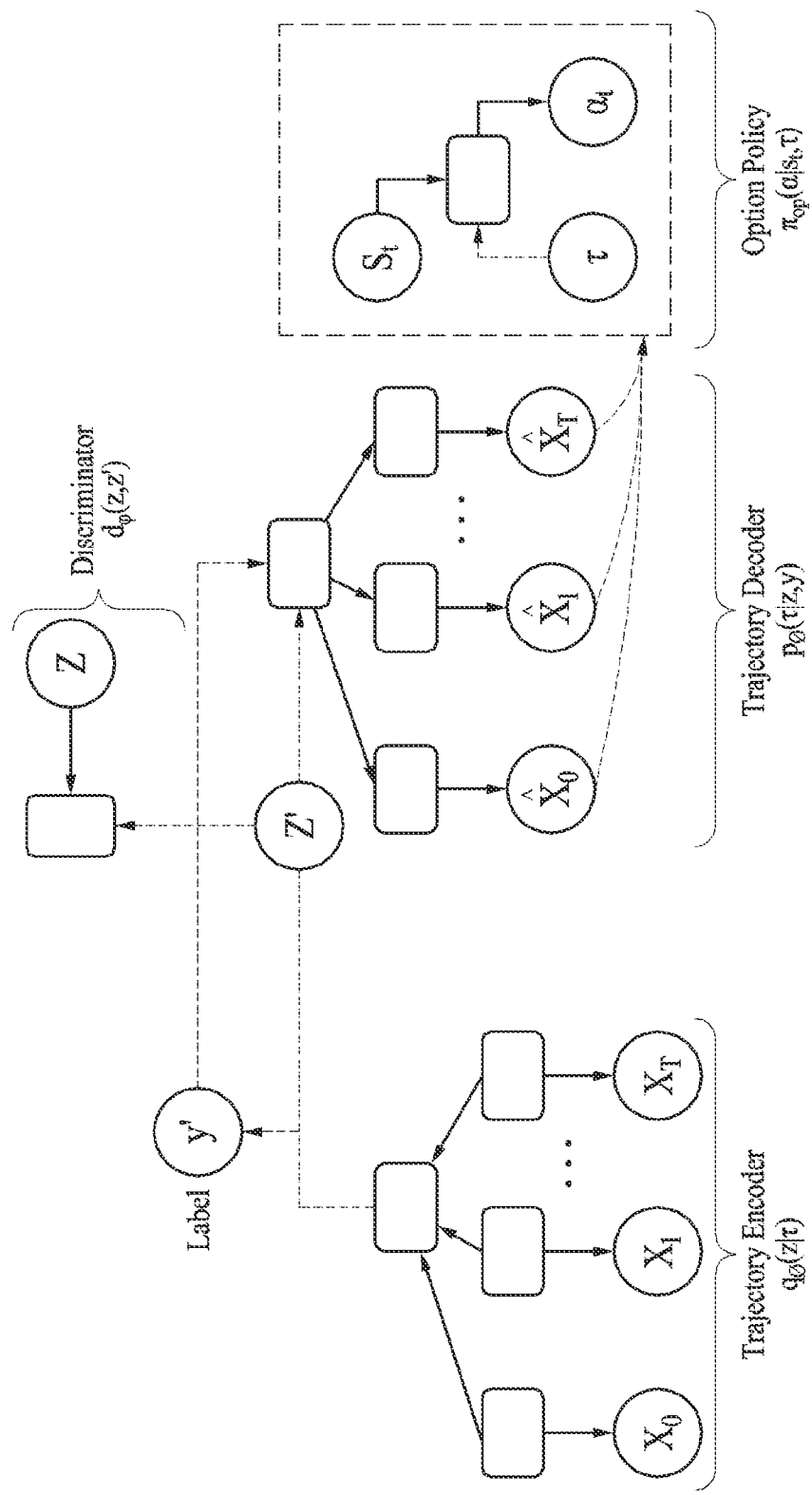
FIG. 3 illustrates an example of a structure of a high-level model.

FIG. 3 illustrates an example of a structure of a high-level model (e.g., the metacontroller 210).

Referring to 3, a high-level model may be based on a semi-adversarial autoencoder (AAE) framework, and may include a trajectory encoder $q_\varphi(z|\tau)$, a trajectory decoder $p_\theta(\tau|z,y)$, and a discriminator $d_\varphi(z,z')$. The high-level model may be trained to generate a latent variable as a three-dimensional (3D) trajectory. The trained high-level model may generate a trajectory for rendering a virtual object while being affected by a latent variable z and a label y.

The trajectory encoder $q_\varphi(z|\tau)$ may generate a GRP and generate a latent variable z' and a label y' through the generated GRP. The trajectory decoder $p_\theta(\tau|z,y)$ may generate a trajectory τ through the latent information z' generated by the trajectory encoder. The differentiator $d_\varphi(z,z')$ may correspond to a module for discriminating between a prior latent variable z, which is a true value, and the latent variable z' generated by the trajectory encoder. As described below, the trajectory encoder and the discriminator may be adversarially trained, and the trajectory encoder may be optimized by calculating a mean squared error of the label and the generated trajectory. Thus, the high-level model may not include a discriminator for discriminating a label.

As described below, the low-level model may be designed to render a virtual object having a trajectory the same as the trajectory τ. A 3D trajectory may be generated at random by the trajectory decoder $p_\theta((\tau|z,y)$ for a long time H, and the generated trajectory may represent continuous positions of a point $[(x_1, y_1, z_1), (x_2, y_2, z_2), \ldots, (x_T, y_T, z_T)]$. A length T of the generated trajectory may be less than H.

For example, the trajectory decoder $p_\theta(\tau|z,y)$ may decode the latent variable z' to continuous positions of a hand based on the label y'. A label is a vector between the current position of the hand (or the position of a start point) and the position of a target point (or the position of an end point) for causing a trajectory sampled by the trajectory decoder to reach the target point from the current position of the hand, and may be calculated based on the current position of the hand and the position of the target point.

According to an example, the trajectory decoder may be trained by hierarchical reinforcement learning to generate a 3D trajectory that follows the GRP through the label and the latent variable. During the training process, various trajectories may be generated based on various labels and latent variables. By applying the trajectories generated at random during the training process to hierarchical reinforcement learning in training the low-level model, the training process of one or more embodiments may increase exploration performance and guarantee reward convergence in sparse reward space.

The GRP may be a trajectory with a smooth curve for a fixed time T. The GRP may define a trajectory distribution generated from a set of M anchoring points used to generate a trajectory.

An anchoring point may be defined as expressed by Equation 3 below, for example.

$$D_a = (t_a; b_a) = \{(t_i; b_i) | i=1,2,\ldots,M\} \quad \text{Equation 3:}$$

In Equation 3, $t_p$ and $b_p$ denote a time index and a position of an i-th anchoring point, respectively.

According to an example, a trajectory P may follow a distribution as expressed by Equation 4 below, for example.

$$P \sim N(\mu_p, K_p) \quad \text{Equation 4:}$$

In Equation 4, $\mu_p$ and $K_p$ denote a mean and a covariance matrix of the trajectory, respectively. In other words, the trajectory may follow a multivariate Gaussian distribution with the mean $\mu_p$ and the covariance $K_p$. Thus, the trajectory may be calculated as expressed by Equations 5 and 6 below, for example.

$$\mu_p = k(t_{sb}, t_a) K_a^{-1} b_a, \quad \text{Equation 5:}$$

$$K_p = K_{sb} - k(t_{sb}, t_a) K_a^{-1} k(t_{sb}, t_a)^2 \quad \text{Equation 6:}$$

In Equations 5 and 6, $t_{sb} = \{t_i | i=1, \ldots, T\}$ denotes the length of a trajectory sampled by the high-level model. $k(t_{sb}, t_a) \in \mathbb{R}^{T \times M}$ denotes a kernel matrix for a time $t_{sb}$ and a time index $t_a$ of an anchoring point. $K_a \in \mathbb{R}^{M \times M}$ denotes a kernel matrix for the time index of the anchoring point. $K_{sb} = k(t_{sb}, t_{sb}) \in \mathbb{R}^{T \times T}$ denotes a kernel matrix for the time index $t_{sb}$. A kernel function may be defined using a squared exponential (SE) function, as expressed by Equation 7 below, for example.

$$k(x, x') = \theta_1 \exp\left(\frac{-\|x - x'\|^2}{2\theta_2}\right) \quad \text{Equation 7}$$

In Equation 7, parameters $\theta_1$ and $\theta_2$ are hyper-parameters for computational efficiency required for regression inference. The trajectories sampled by Equation 4 may be of one dimension, and the trajectories may be independent of each other. Therefore, when trajectory distributions for three dimensions x, y, and z are defined as $P_x$, $P_y$, and $P_z$, a 3D trajectory $P_\tau$ may be defined through a GRP as expressed by Equation 8 below, for example.

$$P_\tau = [P_x, P_y, P_z] \quad \text{Equation 8:}$$

For example, since some of the generated trajectories may resonate or interfere with goal achievement for a long time H, the trajectories generated by the trajectory decoder through the GRP may not always be useful. Accordingly, in order to train the trajectory decoder to generate useful trajectories, the training process of one or more embodiments may implement a trajectory optimization method using a contrastive loss.

According to an example, the goal of the trajectory decoder may be to maximize a conditional probability $p_\theta(\tau|z, \mathcal{Y})$ of a trajectory and maximize an expected value of a reward generated in the hierarchical reinforcement learning process, which may be expressed by Equation 9 below, for example.

$$\max: \mathbb{E}_{\tau \sim p_\theta}[R(\tau, \mathcal{Y})] \quad \text{Equation 9:}$$

In Equation 9, θ denotes a set of parameters of the trajectory decoder, and $y = \{x_1, y_1, z_1, x_T, y_T, z_T\}$ denotes a vector label between the current position and the target point position. R(τ) denotes a reward for a trajectory τ. The high-level policy may be completely differential and learned through back-propagation. Using the likelihood ratio trick, a gradient of an objective function for θ and $\theta^{old}$ may be defined as expressed by Equation 10 below, for example.

$$\nabla_\theta \mathbb{E}_\tau[R(\tau, \mathcal{Y})] = \nabla_\theta \mathbb{E}_{\tau \sim p_{\theta old}}[\log p_\theta(\tau | \mathcal{Y}) R(\tau | \mathcal{Y})]|_{\theta^{old}} \quad \text{Equation 10:}$$

To maximize $\log p_\theta(\tau | \mathcal{Y})$ the concept of the evidence lower bound (ELBO) may be applied, and a latent variable z may be added. Then, $\log p_\theta(\tau | \mathcal{Y})$ may be expressed by Equation 11 below, for example.

$$\log p_\theta(\tau | y) = \mathbb{E}_{z \sim q}\left[\log \frac{p_\theta(\tau, z | y)}{q_\phi(z | \tau, y)}\right] + D_{KL}(q_\phi | p_\theta) \quad \text{Equation 11}$$

The latent variable z may follow $z \sim q \equiv q_\phi(z|\tau, \mathcal{Y})$, and $D_{KL}(q_\phi|p_\theta)$ may be expressed by Equation 12 below, for example.

$$D_{KL}(q_\phi|p_\theta) = D_{KL}(q_\phi(z \vert \tau, \mathcal{Y}) \| p_\theta(z \vert \tau, y))  \quad \text{Equation 12:}$$

ELBO may be defined as expressed by Equation 13 below, for example.

$$\mathbb{E}_{z \sim q}\left[\log \frac{p_\theta(\tau, z \mid y)}{q_\phi(z \mid \tau, y)}\right] = \mathbb{E}_{z \sim q}[\log p_\theta(\tau \mid z, y)] - D_{KL}(q_\phi \mid p(z)),  \quad \text{Equation 13}$$

$$\text{s.t. } D_{KL}(q_\phi \mid p(z)) = D_{KL}(q_\phi(z \mid \tau, y) \| p(z_{prior})).$$

Intuitively, a result of optimizing the trajectory decoder may be the same as a result of optimizing ELBO.

An objective function of the discriminator may be expressed by Equation 14 below, for example.

$$j_{disc} = \mathbb{E}_{z \sim p_{prior}, z' \sim q_\phi}[\log(D(z)) + \log(1 - D(z'))] \quad \text{Equation 14:}$$

z denotes a latent variable sampled from prior information which is a true value. z' denotes a latent variable generated by the trajectory encoder.

An objective function of the trajectory decoder may be expressed by Equation 15 below, for example.

$$\mathbb{E}_\tau[\log p_\theta(\tau \mid y)] > \mathbb{E}_\tau\left[\mathbb{E}_{z \sim \phi}\left[\log \frac{p_\theta(\tau, z \mid y)}{q_\phi(z \mid \tau, y)}\right]\right], \quad \text{Equation 15}$$

$$= \mathbb{E}_\tau[\mathbb{E}_{z \sim \phi}[\log p_\theta(\tau \mid z, y)]].$$

That is, a trajectory sampled by the GRP may be input to the trajectory encoder $q_\phi(z|\tau,y)$. The trajectory encoder may be trained to predict a label y and a continuous latent variable z, and the trajectory decoder $p_\theta(\tau|z,y)$ may be trained to generate a trajectory T the same as the trajectory sampled by the GRP under the condition of the label y and the latent variable z.

As described above, the discriminator $d_\phi(z,z')$ may be a module for discriminating between the prior latent variable z which is a true value and the latent variable z' generated by the trajectory encoder, and the trajectory encoder and the discriminator may be adversarially trained. For example, the trajectory encoder may be trained using a method of matching a distribution for a latent variable and a prior latent variable using adversarial learning. According to an example, information related to a prior latent variable $p_{prior}(z)$ may be normalized through spherical normalization, and semi-supervised learning may be implemented for the trajectory encoder to predict the prior latent variable z corresponding to the trajectory sampled along the input GRP.

According to an example, a mean squared error may be used as a loss function for a label obtained by the trajectory encoder. The label y may cause the trajectory decoder to generate various random trajectories all having the same start point and end point.

According to an example, the goal of the trajectory decoder may be to generate a trajectory that maximizes an expected value of a reward, rather than to generate all trajectories according to the GRP. Thus, a variant contrastive loss defined as expressed by Equation 16 below, for example, may be applied to training the trajectory decoder.

$$L(z, c, \tau_{high}) = c|R(\tau_{high}) - R(p_\theta(\tau \mid z))| + \quad \text{Equation 16}$$

$$(1-c)\max(0, mR(\tau_{high}) - |R(\tau_{high}) - R(p_\theta(\tau \mid z))|),$$

$$\text{s.t. } c = \begin{cases} 1, & \text{if } R(p_\theta(\tau \mid z)) > vR(\tau_{high}) \\ 0, & \text{otherwise.} \end{cases}$$

In Equation 16, c denotes a binary label of "1" or "0", and m denotes a difference between a trajectory reward and a trajectory $\tau_{high}$ that maximizes the expected value of the reward. The trajectory decoder may generate various trajectories during the training process, and $\tau_{high}$ may also change continuously.

A sub-trajectory refers to a trajectory generated by the high-level model and transmitted to the low-level model. In this example, it may be assumed that the sub-trajectory is not anchored. When a reward function for evaluating a sub-trajectory is denoted as $R(\tau)$, the reward function of the sub-trajectory may intuitively determine the shape of an optimal sub-trajectory in the hierarchical reinforcement learning process. Accordingly, the reward function may determine an anchored sub-trajectory. The reward function of the sub-trajectory may be defined as expressed by Equation 17 below, for example.

$$R(\tau) = \|\tau - LoS\|_2 = \sqrt{\sum_{i=1}^{T}(p_i - LoS_i)^2}, \quad \text{Equation 17}$$

$p_i = (x_p, y_p, z_i)$ denotes an i-th position on the sub-trajectory $\tau$. LoS denotes a position of a line from a current position to a position of a target point, and $LoS_i$ denotes an i-th position of LoS.

In order to use a variant contrastive loss function, the sub-trajectory may be classified into two classes of a positive sample (c=0) and a negative sample (c=1). The object of the variant contrastive loss function is to cause the reward function of the positive sample and the anchored sub-trajectory to have a difference greater than or equal to m.

Figure 4A:
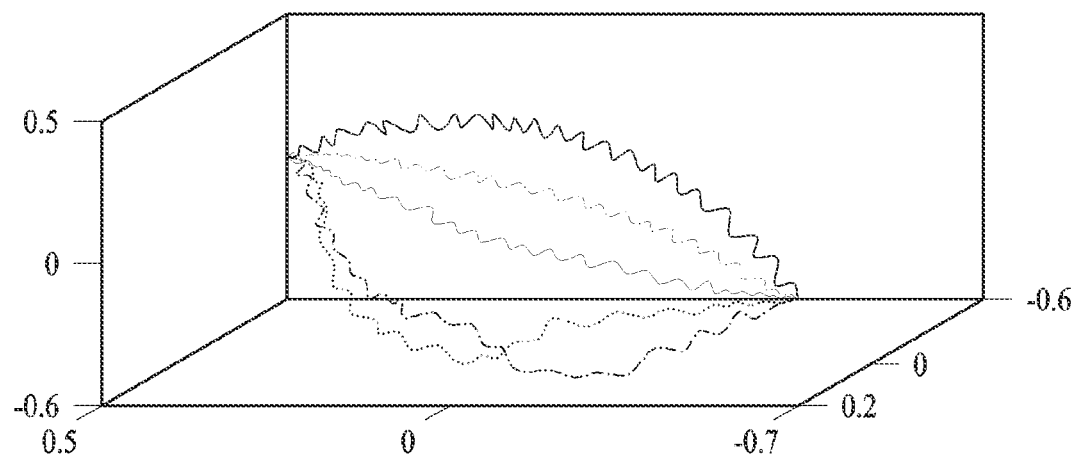
FIGS. 4A to 4C illustrate examples of trajectories generated before and after a variant contrastive loss function is applied.
Figure 4B:
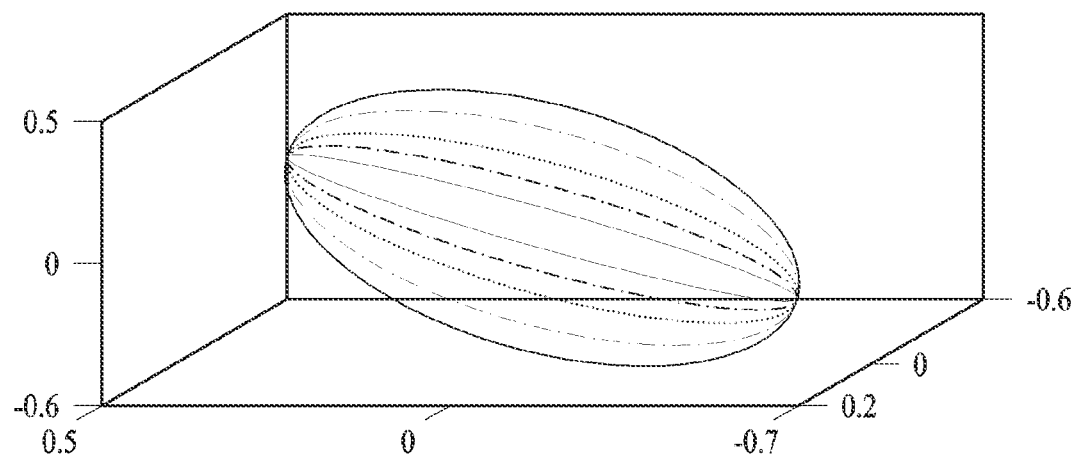
Figure 4C:
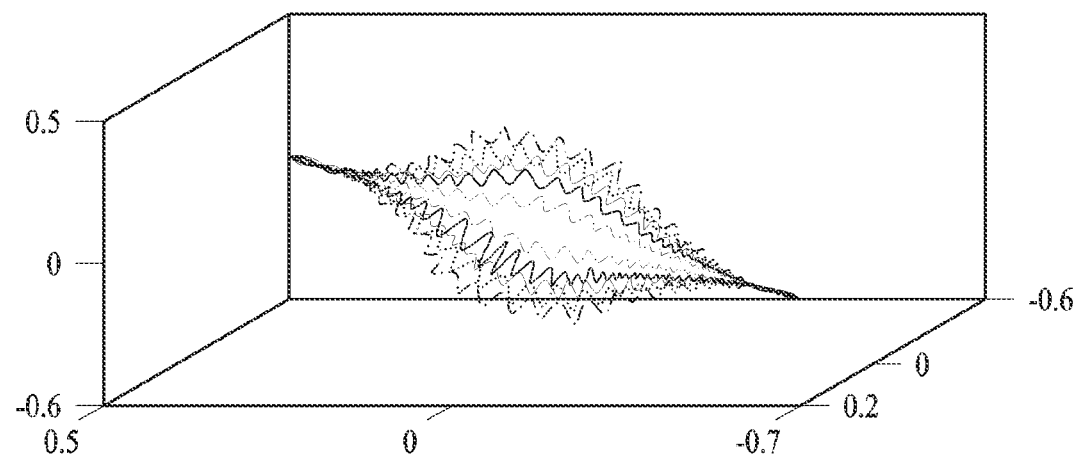

FIGS. 4A to 4C illustrate examples of trajectories generated before and after a variant contrastive loss function is applied.

FIGS. 4A and 4B illustrate trajectories before a variant contrastive loss function is applied to a trajectory decoder, and FIG. 4C illustrates trajectories generated by applying the variant contrastive loss function to the trajectory decoder. The trajectories shown in FIG. 4A are gentle and have different start and end points. The trajectories shown in FIG. 4B are those generated by a GRP, and all are gentle and have the same start and end points. The trajectories shown in FIG. 4C are results of applying the variant contrastive loss function, and have the same start and end points and are jagged. The trajectories shown in FIG. 4C tend to be similar to a straight line (e.g., tend to be more similar to a straight line than the trajectories of either of FIGS. 4A and 4B). That is, the trajectory decoder of one or more embodiments to which the variant contrastive loss function is applied may generate various optimized trajectories. These optimized trajectories may provide more consistent exploration than providing random trajectories, and may guarantee more stable convergence of the low-level model.

Figure 5:
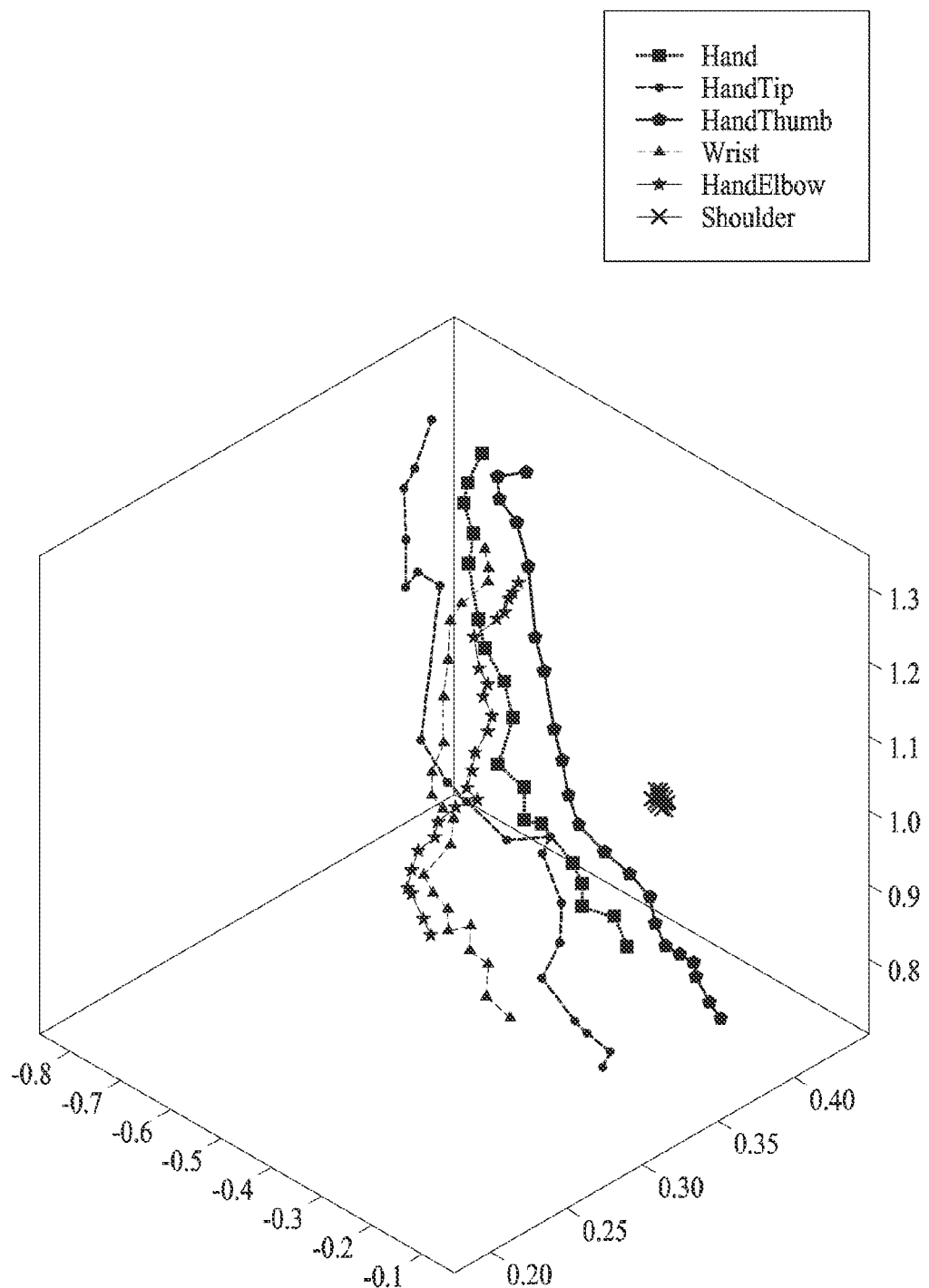
FIG. 5 illustrates an example of input data of a low-level model.

Referring to FIG. 5, a low-level model may receive, at a time as state information, the current positions of a hand (Hand), a thumb (HandThumb), a fingertip (HandTip), a wrist (Wrist), an elbow (HandElbow), and a shoulder (Shoulder). In addition, the low-level model may receive the current position $p_t$ (e.g., first position information corresponding to a first timestep) and a next position $p_{t+1}$ (e.g., second position information corresponding to a second timestep) of the trajectory τ. The low-level model may determine a direction for rendering a virtual object to be an action of an agent by calculating a difference between the next position and the current position of the trajectory. The direction for rendering the virtual object may be calculated as expressed by Equation 18 below, for example.

$$\delta_t = (x_t, y_t, z_t) = p_{t+1} - p_t \quad \text{Equation 18:}$$

The action of the agent output from the low-level model may include an x-axial direction vector, a y-axial direction vector, and a z-axial direction vector for rendering the virtual object. An internal reward function of the low-level model is intended to determine whether the virtual object rendered according to the direction vectors follows the trajectory. The internal reward functions may be modeled as expressed by Equation 19 below, for example.

$$R^c(c_t) = \begin{cases} C \dfrac{\varepsilon_t^2 - \delta_t^2}{\varepsilon_t^2} \text{if.} \delta_t < \varepsilon_t \\ -\dfrac{\delta_t}{\varepsilon_t}, \text{if.} \delta_t \geq \varepsilon_t \end{cases}, \quad \text{Equation 19}$$

In Equation 19, $c_t = (x_t, y_t, z_t)$ denotes the current position of the virtual object. C denotes a positive hyper-parameter. $\varepsilon_t$ may limit the range of positive and negative rewards for a Euclidean distance of $p_t$ and $p_{t+1}$. Therefore, the low-level model may be designed to render a virtual object that follows a trajectory received from the high-level model according to the internal reward function.

FIG. 6 illustrates an example of an overall training algorithm.

Referring to FIG. 6, w denotes a parameter of a low-level policy π. According to the high-level policy $\pi_{meta}$, M trajectories may be generated by a pre-trained trajectory decoder $p_\theta(\tau|z,y)$. Then, a low-level model may generate actions for the M trajectories. Experience replay may store data $(\tau_i, s_t, a_t, f_t, \tau_t)$ for updating the low-level policy, and the low-level policy may be trained by a proximal policy optimization algorithm when an update cycle is reached. A loss function for training the low-level policy may include an alternative loss function $L^{CLIP}$, a critic loss function $L^{Critic}$, and an entropy bonus H, and may be defined as expressed by Equation 20 below, for example.

$$\min_w: L_t = L_t^{CLIP}(w) + c_1 L_t^{Critic}(w) + c_2 H(a_t), \quad \text{Equation 20}$$
$$\text{s.t. } L_t^{CLIP}(w) = \min(\xi \hat{A}_t, \text{clip}(\xi, 1-\epsilon, 1+\epsilon) \hat{A}_t),$$
$$L_t^{Critic}(w) = \|R_t - \gamma V(s_t)\|, H(a_t) = \int_{-\infty}^{\infty} a_t \log_2(a_t) da_t,$$
$$\text{where, } \xi = \pi(a_t | s_t)/\pi_{old}(a_t | s_t),$$
$$\hat{A}_t = \sum_{k=t}^{\infty} [(\gamma\lambda)^{k-t} \cdot (r_t + \gamma V(s_{t+1}) - V(s_t)], a_t \sim N(\mu_\pi, \sigma_\pi^2).$$

In Equation 20, ζ denotes a ratio of the low-level policy and the low-level policy before the update, and $\hat{A}_t$ denotes a generalized advantage estimation (GAE). ε, $c_1$, and $c_2$ denote training parameters. λ, and γ denote GAE parameters. The high-level policy according to the update of the low-level policy may be updated through Equations 13 and 14.

Figure 7A:
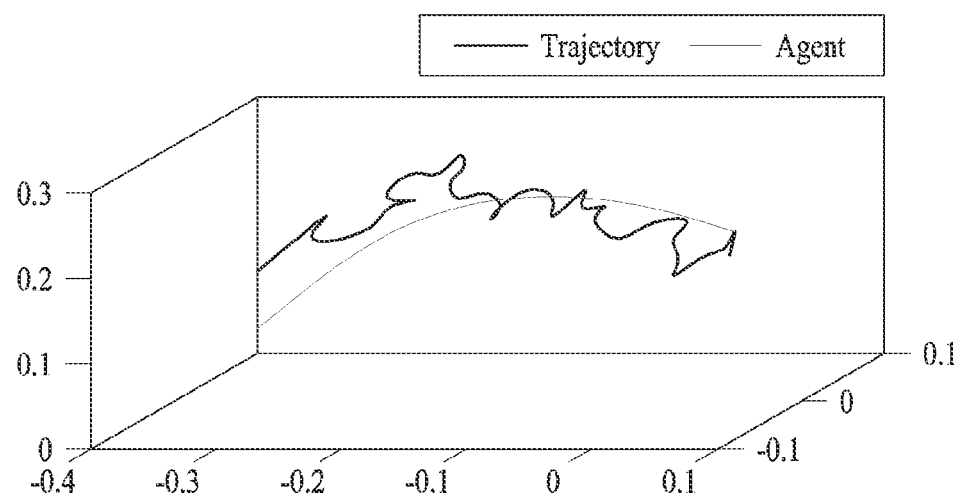
FIGS. 7A to 7C illustrate examples of virtual object rendering results in three dimensions.
Figure 7B:
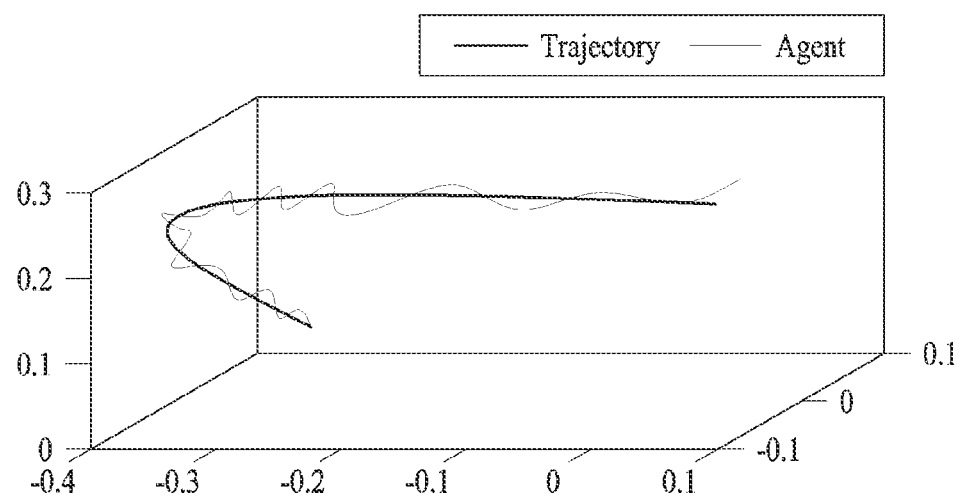
Figure 7C:
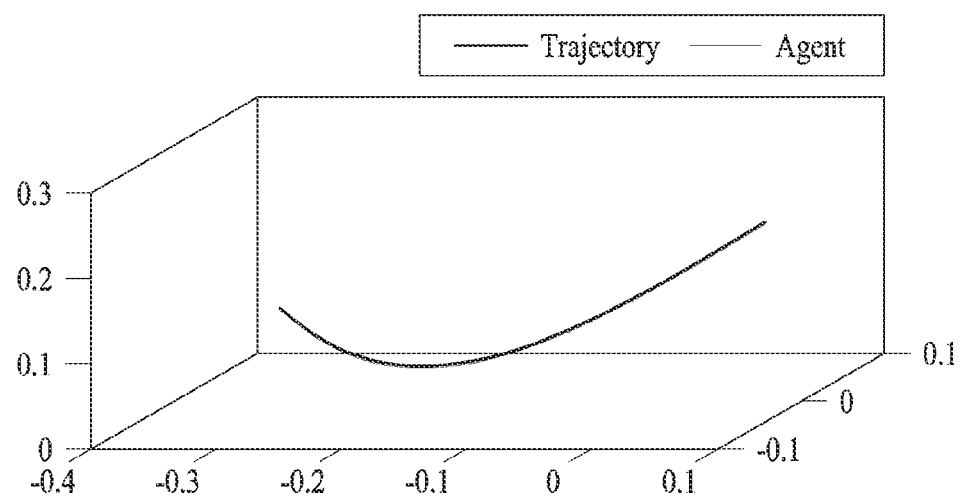
Figure 8A:
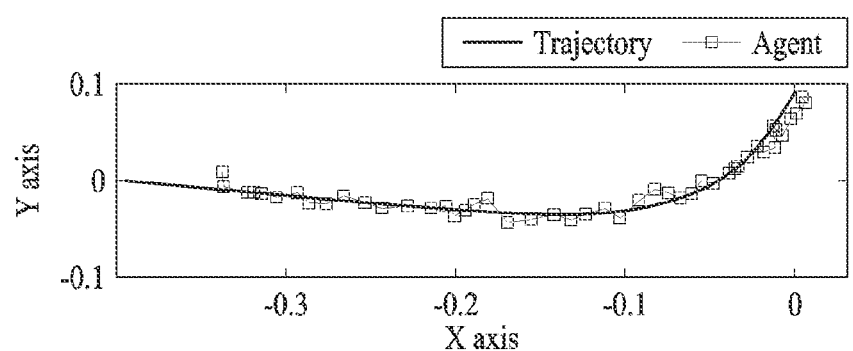
FIGS. 8A to 8D illustrate examples of virtual object rendering results in two dimensions.
Figure 8B:
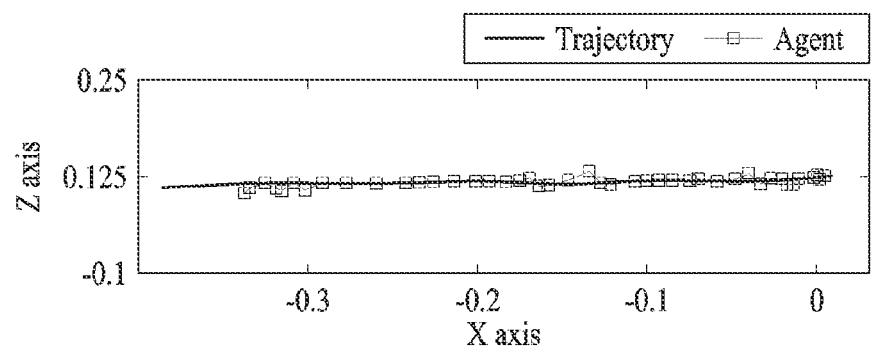
Figure 8C:
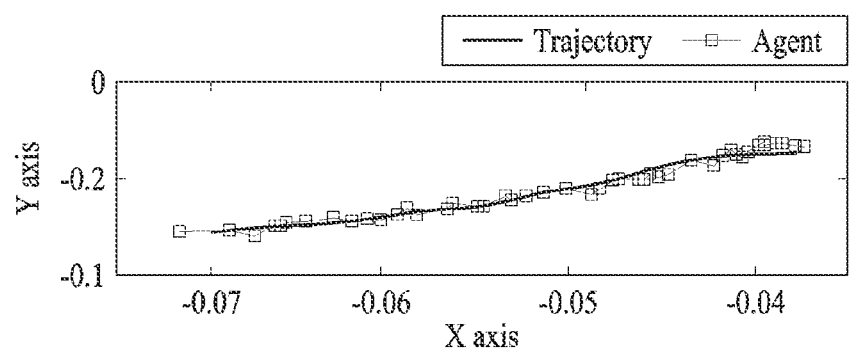
Figure 8D:
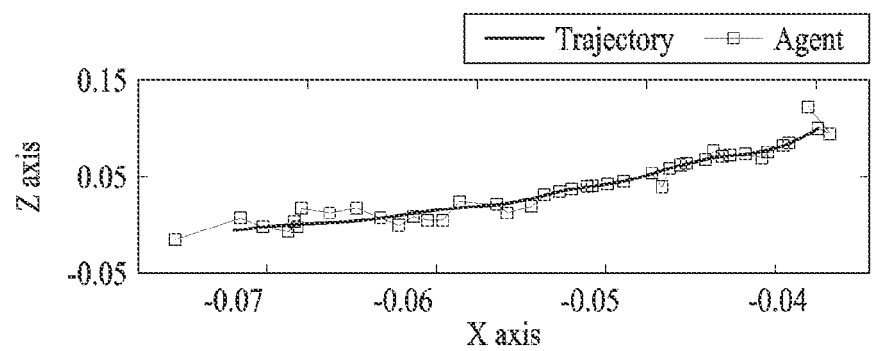

FIGS. 7A to 7C illustrate examples of virtual object rendering results in three dimensions. FIGS. 8A to 8D illustrate examples of virtual object rendering results in two dimensions. Referring to 7A to 8D, it may be learned that a virtual object (agent) rendered by a low-level model according to a low-level policy well follows a trajectory generated by a high-level model according to a high-level policy.

Figure 9:
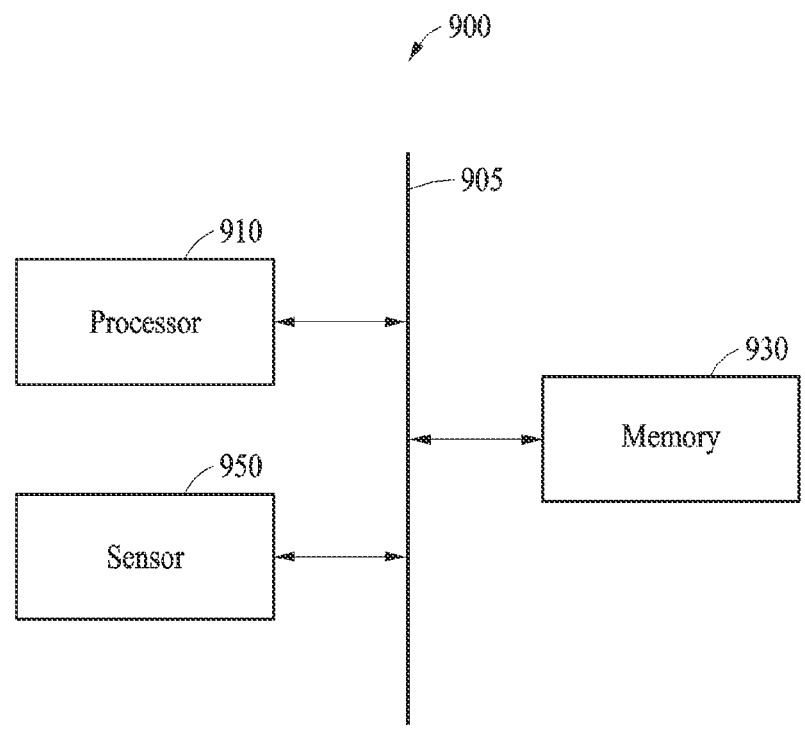
FIG. 9 illustrates an example of a virtual object rendering apparatus.

FIG. 9 illustrates an example of an apparatus for rendering a virtual object.

Referring to FIG. 9, a virtual object rendering apparatus 900 may be configured to perform one or more or all steps, operations, or methods described above with reference to FIGS. 1 through 8.

The virtual object rendering apparatus 900 may be a computing device. The virtual object rendering apparatus 900 may be, for example, a personal computer (PC), an advanced driver assistance system (ADAS), a head-up display (HUD) device, a camera, a 3D digital information display (DID), a navigation device, a neuromorphic device, a 3D mobile device, a smartphone, a smart television (TV), a smart vehicle, an internet of things (IoT) device, a medical device, or the like. The 3D mobile device may include, for example, a display device configured to display AR, virtual reality (VR), and/or mixed reality (MR), a head-mounted display (HMD), a face-mounted display (FMD), and AR glasses.

The virtual object rendering apparatus 900 may include a processor 910 (e.g., one or more processors), a memory 930 (e.g., one or more memories), and a sensor 950 (e.g., one or more sensors). The processor 910, the memory 930, and the sensor 950 may communicate with one another through a communication bus 905.

The processor 910 may control an overall operation of the virtual object rendering apparatus 900 and implement operations or methods by execution of instructions stored in the memory 930. The processor may include any one or more or all of the encoders, decoders, discriminators, and autoencoders described above with references to FIGS. 1 through 8. The processor 910 may be configured to perform one or more or all steps, operations, or methods described above with reference to FIGS. 1 through 8. For example, the processor 910 may render a second object, which is a virtual object, based on determined direction information, and may train, for a plurality of obtained trajectories, a low-level model to output direction information of a virtual object moving along the trajectories.

The memory 930 may store information used by the processor 910 to perform operations. For example, the memory 930 may store instructions, which when executed by the processor 910, configure the processor to perform one or more or all steps, operations, or methods described above with reference to FIGS. 1 through 8, as well as related information for the execution of other functions or other applications of the virtual object rendering apparatus 900. The memory 930 may include, as a memory, an RAM, a DRAM, an SRAM, and other types of nonvolatile memory that are known in the related technical field. In addition, the memory 930 may be a computer-readable storage medium or device, such as, for example, a storage, a magnetic hard disk, an optical disc, a flash memory device, and the like.

The sensor 950 may be or include a camera which captures an input image.

The metacontrollers, controllers, apparatuses for rendering a virtual object, processors, memories, sensors, metacontroller 210, controller 220, apparatus for rendering a virtual object 900, processor 910, memory 930, sensor 950, and other apparatuses, units, modules, devices, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with virtual object rendering, the method comprising:
   determining a plurality of predictive trajectories of a first object according to a Gaussian random path based on a high-level model that is trained by hierarchical reinforcement learning to output the predictive trajectories based on latent variables and vector labels of a start point and an end point related to the Gaussian random path;
   determining direction information of a second object according to subgoals corresponding to the predictive trajectories based on a low-level model that is trained by hierarchical reinforcement learning by training the low-level model, for the predictive trajectories output from the high-level model, to output direction information of the second object moving along the predictive trajectories;
   determining the direction information of the second object according to a subgoal corresponding to one of the predictive trajectories based on an actual trajectory of the first object; and
   rendering the second object, which is a virtual object, based on the determined direction information.

2. The method of claim 1, wherein the determining of the direction information of the second object comprises:
   selecting one of the predictive trajectories based on similarities between the actual trajectory and the predictive trajectories; and
   determining the direction information of the second object according to a subgoal corresponding to the selected predictive trajectory.

3. The method of claim 1, wherein the determining of the plurality of predictive trajectories of the first object comprises determining a plurality of predictive trajectories corresponding to the latent variables related to the Gaussian random path and the vector labels between the start point and the end point related to the Gaussian random path, based on a pre-trained trajectory decoder of the high-level model.

4. The method of claim 1, wherein
   the high-level model comprises a trajectory encoder and a trajectory decoder, and
   the trajectory encoder is trained to output a latent variable corresponding to an input Gaussian random path, and the trajectory decoder is trained to output a trajectory according to the input Gaussian random path based on the latent variable output from the trajectory encoder and the vector labels of the start point and the end point related to the Gaussian random path.

5. The method of claim 4, wherein the trajectory encoder is adversarially trained based on a discriminator trained to discriminate between a prior latent variable corresponding to an input Gaussian random path and the latent variable output from the trajectory encoder.

6. The method of claim 1, further comprising:
   extracting a feature point of the first object from an input image; and
   determining the actual trajectory of the first object based on a displacement of the extracted feature point included in a frame of the image.

7. A non-transitory computer-readable storage medium storing instructions that, when executed by one or more processors, configure the one or more processors to perform the method of claim 1.

8. A processor-implemented method with virtual object rendering model training, the method comprising:
   training, based on an input Gaussian random path, a trajectory encoder of a high-level model to output a latent variable of the Gaussian random path;
   training a trajectory decoder of the high-level model to output a trajectory according to the Gaussian random path based on the latent variable output from the trajectory encoder and a vector label between a current position and a target point position;
   determining a plurality of trajectories based on the trained trajectory decoder; and
   training, for the plurality of determined trajectories, a low-level model to output direction information of a virtual object moving along the trajectories.

9. The method of claim 8, wherein the input Gaussian random path comprises at least one trajectory that follows a multivariate Gaussian distribution.

10. The method of claim 8, wherein the training of the trajectory encoder comprises adversarially training the trajectory encoder based on a discriminator trained to discriminate between a prior latent variable corresponding to the input Gaussian random path and the latent variable output from the trajectory encoder.

11. The method of claim 8, wherein the training of the trajectory decoder comprises training the trajectory decoder based on a loss function to reduce a difference between a generated trajectory and a line between a start point and an end point related to the Gaussian random path.

12. The method of claim 8, wherein the training of the low-level model comprises training the low-level model to output the direction information of the virtual object moving along the trajectory based on an internal reward function that is based on a difference between first position information corresponding to a first timestep of the trajectory and second position information corresponding to a second timestep of the trajectory.

13. The method of claim 8, further comprising:
   determining a plurality of predictive trajectories of a first object according to the Gaussian random path based on the trained trajectory encoder of the high-level model;
   determining direction information of a second object according to subgoals corresponding to the predictive trajectories based on the trained low-level model;
   determining direction information of the second object according to a subgoal corresponding to one of the predictive trajectories based on an actual trajectory of the first object; and
   rendering the second object, which is the virtual object, based on the determined direction information.

14. An apparatus with virtual object rendering, the apparatus comprising:
   one or more processors configured to:
      determine a plurality of predictive trajectories of a first object according to a Gaussian random path based on a high-level model that is trained by hierarchical reinforcement learning to output the predictive trajectories based on latent variables and vector labels of a start point and an end point related to the Gaussian random path,
      determine direction information of a second object according to subgoals corresponding to the predictive trajectories based on a low-level model that is trained by hierarchical reinforcement learning by training the low-level model, for the predictive trajectories output from the high-level model, to output direction information of the second object moving along the predictive trajectories, determine the direction information of the second object according to a subgoal corresponding to one of the predictive trajectories based on an actual trajectory of the first object, and render the second object, which is a virtual object, based on the determined direction information.

15. The apparatus of claim 14, wherein the one or more processors are further configured to, in determining the direction information of the second object:

select one of the predictive trajectories based on similarities between the actual trajectory and the predictive trajectories, and determine the direction information of the second object according to a subgoal corresponding to the selected predictive trajectory.

16. The apparatus of claim 14, wherein the one or more processors are further configured to, in determining the plurality of predictive trajectories of the first object:

determine a plurality of predictive trajectories corresponding to the latent variables related to the Gaussian random path and the vector labels between the start point and the end point related to the Gaussian random path, based on a pre-trained trajectory decoder of the high-level model.

17. The apparatus of claim 14, wherein the high-level model comprises a trajectory encoder and a trajectory decoder, and wherein the trajectory encoder is trained to output a latent variable corresponding to an input Gaussian random path, and the trajectory decoder is trained to output a trajectory according to the Gaussian random path based on the latent variable output from the trajectory encoder and the vector labels of the start point and the end point related to the Gaussian random path.

18. The apparatus of claim 17, wherein the trajectory encoder is adversarially trained based on a discriminator trained to discriminate between a prior latent variable corresponding to an input Gaussian random path and the latent variable output from the trajectory encoder.

19. The apparatus of claim 14, wherein the one or more processors are further configured to, in determining the direction information of the second object:

extract a feature point of the first object from an input image, and determine the actual trajectory of the first object based on a displacement of the extracted feature point included in a frame of the image.

20. A processor-implemented method with virtual object rendering, the method comprising:

determining a plurality of predictive trajectories of a real object according to a Gaussian random path based on a high-level model that is trained to output a latent variable corresponding to the Gaussian random path and to output a trajectory according to the Gaussian random path based on the latent variable and vector labels of a start point and an end point related to the Gaussian random path;

determining direction information of a virtual object according to subgoals corresponding to the predictive trajectories based on a low-level model that is trained using the trained high-level model by training the low-level model, for the predictive trajectories output from the high-level model, to output direction information of the virtual object moving along the predictive trajectories; and rendering the virtual object based on the determined direction information.

21. The method of claim 20, wherein the low-level model is trained based on trajectories generated at random using the high-level model.

22. The method of claim 20, wherein the high-level model is trained to output the trajectory according to the Gaussian random path based on a variant contrastive loss of the output trajectory.

* * * * *